US008846584B2

(12) United States Patent
Mang

(10) Patent No.: US 8,846,584 B2
(45) Date of Patent: Sep. 30, 2014

(54) METHODS OF PREPARING DEGRADABLE MATERIALS

(75) Inventor: Michael N. Mang, Eden Prairie, MN (US)

(73) Assignee: Halliburton Energy Services, Inc., Houston, TX (US)

( * ) Notice: Subject to any disclaimer, the term of this patent is extended or adjusted under 35 U.S.C. 154(b) by 325 days.

(21) Appl. No.: 13/435,217

(22) Filed: Mar. 30, 2012

(65) Prior Publication Data

US 2012/0181035 A1    Jul. 19, 2012

Related U.S. Application Data

(60) Division of application No. 11/983,245, filed on Nov. 8, 2007, now Pat. No. 8,598,092, which is a continuation-in-part of application No. 11/049,464, filed on Feb. 2, 2005, now abandoned.

(51) Int. Cl.
| | | |
|---|---|---|
| *C09K 8/60* | (2006.01) | |
| *C08L 101/16* | (2006.01) | |
| *C09K 8/516* | (2006.01) | |
| *C09K 8/80* | (2006.01) | |
| *C09K 8/68* | (2006.01) | |
| *C09K 8/88* | (2006.01) | |
| *C08J 3/12* | (2006.01) | |
| *C04B 28/02* | (2006.01) | |
| *C09K 8/62* | (2006.01) | |
| *C09K 8/487* | (2006.01) | |
| *C09K 8/467* | (2006.01) | |
| *C09K 8/035* | (2006.01) | |

(52) U.S. Cl.
CPC ............... *C09K 8/516* (2013.01); *C08L 101/16* (2013.01); *C09K 2208/18* (2013.01); *C09K 8/80* (2013.01); *C09K 8/68* (2013.01); *C09K 8/887* (2013.01); *C08J 3/12* (2013.01); *C04B 28/02* (2013.01); *C09K 8/62* (2013.01); *C09K 8/487* (2013.01); *C09K 8/467* (2013.01); *C09K 2208/26* (2013.01); *C08J 2300/16* (2013.01); *C09K 8/035* (2013.01)
USPC .......................................... 507/219; 166/305.1

(58) Field of Classification Search
None
See application file for complete search history.

(56) References Cited

U.S. PATENT DOCUMENTS 8,598,092 B2    12/2013 Mang

OTHER PUBLICATIONS

Matsuyama et al, Environmentally Benign Formation of Polymeric Microspheres by Rapid Expansion of Supercritical Carbon Dioxide Solution with Nonsolvent, Environ. Sci. Technol. 2001, 35,4149-4155.*

* cited by examiner

*Primary Examiner* — Alicia Bland
(74) *Attorney, Agent, or Firm* — McDermott Will & Emery LLP; Holly Soehnge

(57) ABSTRACT

Methods of creating degradable particulates in a subterranean environment. The methods provide a degradable material supercritical fluid mixture that comprises degradable material into a wellbore penetrating a subterranean formation and provide an orifice between the wellbore and the subterranean formation wherein the pressure in the subterranean formation is less than the pressure in the wellbore. The degradable material supercritical fluid is then fed through the orifice into the subterranean formation such that the degradable material supercritical fluid mixture expands through an orifice into the lower subterranean formation and particulates are formed.

7 Claims, No Drawings

METHODS OF PREPARING DEGRADABLE MATERIALS

CROSS-REFERENCE TO RELATED APPLICATIONS

The present invention is a continuation-in-part of U.S. patent application Ser. No. 11/049,464, filed on Feb. 2, 2005, entitled "Degradable Particulate Generation and Associated Methods", the entire disclosure of which is incorporated herein by reference.

BACKGROUND

The present invention relates generally to degradable particulates. More particularly, the present invention relates to methods for producing degradable particulates and slurries thereof, and methods related to the use of such degradable particulates and slurries in subterranean applications.

Degradable particulates comprise degradable materials (which oftentimes comprise degradable polymers) that are capable of undergoing an irreversible degradation when used in subterranean applications, e.g., in a well bore. As used herein, the terms "particulate" or "particulates" refer to a particle or particles that may have a physical shape of platelets, shavings, fibers, flakes, ribbons, rods, strips, spheroids, toroids, pellets, tablets, or any other suitable shape. The term "irreversible" as used herein means that the degradable material should degrade in situ (e.g., within a well bore) but should not recrystallize or reconsolidate in situ after degradation (e.g., in a well bore). The terms "degradation" or "degradable" refer to both the two relatively extreme cases of hydrolytic degradation that the degradable material may undergo, e.g., heterogeneous (or bulk erosion) and homogeneous (or surface erosion), and any stage of degradation in between these two. This degradation can be a result of, inter alia, a chemical or thermal reaction, or a reaction induced by radiation. The terms "polymer" or "polymers" as used herein do not imply any particular degree of polymerization; for instance, oligomers are encompassed within this definition.

The degradability of a degradable polymer often depends, at least in part, on its molecular structure. For instance, the presence of hydrolyzable and/or oxidizable linkages in the molecular structure often yields a material that will degrade as described herein. The rates at which such polymers degrade may be dependent on, among other things, the type(s) of repetitive units, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

The physical properties of degradable polymers may depend on several factors such as the composition of the repeat units, flexibility of the chain, presence of polar groups, molecular mass, degree of branching, crystallinity, orientation, etc. For example, short chain branches may reduce the degree of crystallinity of polymers while long chain branches lower the melt viscosity and impart, inter alia, extensional viscosity with tension-stiffening behavior. The degradability of a polymer can be further tailored by blending and copolymerizing it with another polymer, or by changing the macromolecular architecture (e.g., hyper-branched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains. For example, poly(phenyllactide) will degrade at about one fifth of the rate of racemic poly(lactide) at a pH of 7.4 at 55° C.

Oftentimes degradable materials are commercially available in pellet form. However, for use in certain subterranean operations (e.g., as acid precursors, fluid loss control particles, diverting agents, filter cake components, drilling fluid additives, cement additives, etc.), it may be desirable to alter the average particle size of the degradable materials, among other purposes, to facilitate the dispersion of the materials in a slurry, and/or to control the reactivity and/or rate of reactivity of the degradable materials.

Thus certain processes may be desired to generate degradable particulates that can be transported to a job site and used in subterranean treatments. Common manufacturing processes that may produce such particulates include cryogenic grinding, which is an expensive process that involves grinding a degradable polymer, such as poly(lactic acid), at cryogenic temperatures to form particulates and powders having a desired shape and size. Oftentimes, these grinding processes are inefficient, requiring large volumes of liquid nitrogen and multiple passes through equipment, which usually results in yield losses. Moreover, cryogenic grinding methods generally are not useful for making degradable particulates that are smaller than about 150 microns in diameter. Also, mechanical classification (e.g., mechanical classification to separate particulates of differing sizes to obtain a specific size distribution) often is required to obtain narrow particle size distributions.

Another method that may be used to make degradable particulates off-site is spray drying. Spray drying processes usually involve dissolution of a degradable polymer sample in a volatile solvent (which can be an environmental problem itself), and spraying the solution into a stream of hot gas to make degradable particulates. However, mechanical classification and spray drying processes generally need to be carried out in a specially-designed factory setting, and the large scale production of degradable particulates of the desired sizes using these processes may not be practicable. Another method of producing degradable particulates is an extrusion method; however, extrusion methods generally are not useful for making degradable particulates that are smaller than about 500 microns in diameter. Moreover, some processes known in the art for generating degradable particulates utilize certain types of surfactants (e.g., sodium dodecyl sulfate) that may be effective in small-scale production methods, but may be less practicable for producing degradable polymer particles on a larger scale.

SUMMARY

The present invention relates generally to degradable particulates. More particularly, the present invention relates to methods for producing degradable particulates and slurries thereof, and methods related to the use of such degradable particulates and slurries in subterranean applications.

In one embodiment, the present invention provides methods comprising: providing a degradable material mixture that comprises a degradable material and a first solvent; providing a fluid that comprises a second solvent and a surfactant, wherein the first and second solvents are immiscible in each other; combining the degradable material mixture and the fluid with sufficient shear to form an emulsion that comprises a discontinuous phase and a continuous phase, the discontinuous phase comprising the degradable material mixture and the continuous phase comprising the second solvent;

removing at least a portion of the first solvent from the discontinuous phase; and forming a plurality of degradable particulates.

In another embodiment, the present invention provides methods comprising: providing a degradable material mixture that comprises a degradable material and a first solvent; and combining the degradable material mixture with a second solvent with shear to form a solid liquid dispersion comprising a solid phase and a liquid phase, the solid phase comprising degradable particulates and the liquid phase comprising the first solvent and the second solvent, wherein the first and second solvents are soluble in each other.

In another embodiment, the present invention provides methods comprising: (a) providing a degradable material mixture that comprises a degradable material and a first solvent; (b) providing a fluid that comprises a second solvent and a surfactant; (c) combining the degradable material mixture and the fluid with sufficient shear to form an emulsion that comprises a discontinuous phase and a continuous phase, the discontinuous phase comprising the degradable material mixture and the continuous phase comprising the fluid; (d) removing at least a portion of the first solvent from the discontinuous phase; (e) forming a slurry that comprises degradable particulates and the second solvent; and (f) introducing at least a portion of the slurry of degradable particulates into at least a portion of the subterranean formation.

In another embodiment, the present invention provides methods comprising: providing a degradable material supercritical fluid mixture that comprises a degradable material; allowing the degradable material supercritical fluid mixture to expand through an orifice into a lower pressure zone; and allowing degradable particulates to form.

In another embodiment, the present invention provides methods comprising: providing a degradable material melt that comprises a degradable material; atomizing the degradable material melt into an atomization fluid stream; and allowing degradable particulates to form.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates generally to degradable particulates. More particularly, the present invention relates to methods for producing degradable particulates and slurries thereof, and methods related to the use of such degradable particulates and slurries in subterranean applications.

The present invention provides methods of generating degradable particulates and slurries of such degradable particulates. As used herein, the terms "particulate" or "particulates" refer to a particle or particles that may have a physical shape of platelets, shavings, fibers, flakes, ribbons, rods, strips, spheroids, toroids, pellets, tablets, or any other suitable shape. The term "degradable" as used herein refers to an irreversible degradation. The terms "degradation" or "degradable" refer to both the two relatively extreme cases of hydrolytic degradation that the degradable material may undergo, e.g., heterogeneous (or bulk erosion) and homogeneous (or surface erosion), and any stage of degradation in between these two cases. This degradation can be a result of, inter alia, a chemical or thermal reaction, or a reaction induced by radiation. The term "irreversible" as used herein means that the degradable material should degrade in situ (e.g., within a well bore) but should not recrystallize or reconsolidate in situ after degradation (e.g., in a well bore).

The present invention provides methods that may be used to generate degradable particulates of a suitable or desirable size and shape for use in subterranean applications. One of the many advantages offered by certain methods and compositions of the present invention is the ability to modify the degradable particulates to respond to changes in conditions and requirements. For instance, the particle size distribution and/or relative pliability of the particulates could be modified based on the particular subterranean conditions encountered. The degradable particulates may have differing properties, such as, relative hardness, pliability, degradation rate, etc., depending on the processing factors, the type of degradable polymer used, etc. The specific properties of the degradable particulates produced may vary by varying certain process parameters (including compositions), which will be evident to one of ordinary skill in the art with the benefit of this disclosure. Examples of subterranean applications in which the generated degradable particulates could be used include, but are not limited to, applications such as fluid loss control particles, diverting agents, filter cake components, drilling fluid additives, cement composition additives, other acid-precursor components, and the like.

In certain embodiments, the present invention also provides methods that may be used to directly generate slurries of degradable particulates in water without the need for additional steps or methods, which may alleviate the need to generate the degradable particulates and subsequently add them to water or another fluid in a separate step to form a slurry, or may reduce the amount of water or other fluid that needs to be added to form a slurry. The degradable particulates or slurries thereof can be used in a subterranean application with or without a treatment fluid, depending on the use. As used herein, the term "slurry" refers to any mixture of suspended solids (e.g., the degradable particulates, acid soluble materials, and the like) and liquids.

The degradable particulates and slurries thereof made in conjunction with a method of the present invention can be combined with treatment fluid shortly after forming them, or they may be stored in a suitable collection container for use at a desired time. As used herein, the term "treatment fluid" refers to any fluid that may be used in a subterranean application in conjunction with a desired function and/or for a desired purpose. The term "treatment fluid" does not imply any particular action by the fluid or any component thereof. In some embodiments, a treatment fluid (or component thereof) with which the degradable particulates will be placed into a well bore may be incorporated into a method of making the degradable particulates, e.g., as a solvent or fluid in the process.

In certain embodiments, the degradable particulates or slurries thereof may be made and then stored for a desired period of time. In other embodiments of this invention, the degradable particulates or slurries thereof can be made and then used relatively promptly in a subterranean application. Among other things, the storability of the degradable particulates and slurries thereof, and the particular application in which they will be used, may dictate whether storage or immediate use is preferred. In certain embodiments, the degradable particulates or slurries thereof may be produced using a method of the present invention at a job site (e.g., a site where a well bore has been drilled in a subterranean formation), or they may be produced at an off-site facility and then transported to a job site for use.

In certain embodiments, the methods of the present invention comprise: providing a degradable material mixture that comprises a degradable material and a first solvent; providing a fluid that comprises a second solvent and a surfactant, wherein the first and second solvents are immiscible in each other; combining the degradable material mixture and the fluid with sufficient shear to form an emulsion that comprises a discontinuous phase and a continuous phase, the discontinuous phase comprising the degradable material mixture and the continuous phase comprising the second solvent; and removing at least a portion of the first solvent from the discontinuous phase; and forming a plurality of degradable particulates. As used herein, the term "solvent" does not require that any other substance (e.g., the degradable material) necessarily be dissolved to any degree therein, and thus the degradable material mixture comprising the first solvent and the fluid comprising the second solvent do not necessarily comprise solutions of any material dissolved in the first or second solvents.

In certain embodiments, the methods of the present invention comprise: providing a degradable material mixture that comprises a degradable material and a first solvent; providing a fluid that comprises a second solvent and a surfactant, wherein the first and second solvents are immiscible in each other; combining the degradable material mixture and the fluid with sufficient shear to form a first emulsion that comprises a discontinuous phase and a continuous phase, the discontinuous phase comprising the degradable material mixture and the continuous phase comprising the fluid; continuing to combine the fluid with the first emulsion until phase inversion occurs to form a second emulsion, the second emulsion comprising a discontinuous phase that comprises the degradable material mixture and a continuous phase that comprises the second solvent; removing the first solvent from the discontinuous phase of the second emulsion; and forming a dispersion of degradable particulates in the continuous phase of the second emulsion.

The degradable particulates produced in the methods of the present invention can be used in a subterranean application with or without a treatment fluid, depending on the use. In some embodiments, the fluid used in producing the degradable particulates may comprise a treatment fluid. This may be beneficial when a high concentration of degradable particulates in the treatment fluid (e.g., above about 25% by weight of the fluid) is desired. In other embodiments, the degradable particulates or slurries thereof can be made in a batch process and then at a desired time, they may be added to a treatment fluid to be placed in a subterranean formation. These methods may be useful, for example, when a lower concentration of degradable particulates is desired for the application.

The degradable material mixture may be any suitable type of mixture of a degradable material and a solvent including, but not limited to, a solution and/or a suspension. In one embodiment, the degradable material mixture may be formed by forming a degradable monomer mixture (which may comprise a solution and/or a suspension), and then reacting the degradable monomer mixture to polymerize the monomer to form a degradable polymer mixture that may be used to form degradable particulates. One of ordinary skill in the art with the benefit of this disclosure will recognize whether heat or a suitable catalyst will be needed to affect polymerization depending on, among other things, the type of monomer(s) used and the type of solvent used. Any suitable heating devices and/or catalysts may be used.

The degradable materials used in the present invention may be provided in any form known in the art for such materials (e.g., pelletized degradable materials). In certain embodiments, these degradable materials may comprise one or more degradable polymers. The terms "polymer" or "polymers" as used herein do not imply any particular degree of polymerization; for instance, oligomers are encompassed within this definition. In certain embodiments, the degradable materials may comprise degradable polymers that are crosslinked or branched. Examples of suitable degradable materials that may be used in conjunction with the methods of this invention include, but are not limited to, aliphatic polyesters, poly(lactides), poly(glycolides), poly(ϵ-caprolactones), poly(hydroxy ester ethers), poly(hydroxybutyrates), poly(anhydrides), polycarbonates, poly(orthoesters), poly(orthoethers), poly(amino acids), poly(ethylene oxides), poly(phosphazenes), poly ether esters, polyester amides, polyamides, and copolymers, blends, or derivatives of any of these degradable materials. The term "derivative" is defined herein to include any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "copolymer" as used herein is not limited to the combination of two polymers, but includes any combination of polymers, e.g., terpolymers and the like. Other degradable materials that are subject to hydrolytic degradation also may be suitable. One's choice of degradable materials may depend on the particular subterranean application and conditions involved. Other guidelines to consider include the degradation products that result, the time for required for the requisite degree of degradation, and the desired result of the degradation (e.g., voids). Other suitable degradable materials include those degradable materials that release useful or desirable degradation products, e.g., an acid. Such degradation products may be useful in a downhole application, e.g., to break a viscosified treatment fluid or an acid soluble component present therein (such as in a filter cake).

In certain embodiments, the degradable material may comprise aliphatic polyesters having the general formula of repeating units shown below:

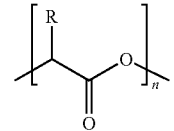

Formula I where n is an integer between 75 and 10,000 and R is a hydrogen, alkyl, aryl, alkylaryl, acetyl, heteroatoms, or mixtures thereof. An example of one such aliphatic polyester is poly(lactide). Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to Formula I without any limitation as to how the polymer was made such as from lactides, lactic acid, or oligomers, and without reference to the degree of polymerization or level of plasticization. The lactide monomer exists generally in three different forms: two stereoisomers L- and D-lactide and racemic D,L-lactide (meso-lactide). The oligomers of lactic acid, and oligomers of lactide are defined by the formula:

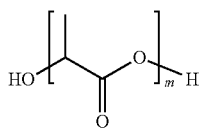

Formula II where m is an integer 2≤m≤75. In certain embodiments, m is an integer and 2≤m≤10. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable particulates is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined to be used in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified to be used in the present invention by, inter alia, blending, copolymerizing or otherwise mixing the stereoisomers, blending, copolymerizing or otherwise mixing high and low molecular weight poly(lactides), or by blending, copolymerizing or otherwise mixing a poly(lactide) with another polyester or polyesters.

Optionally, the degradable materials used in the present invention may comprise one or more crosslinked degradable polymers. In some embodiments, it may be desirable to include a crosslinked degradable polymer, among other purposes, to increase the impact strength, tensile strength, compressive strength, high temperature dimensional stability, creep resistance, and modulus of the degradable material.

Crosslinked degradable polymers suitable for use in the present invention may comprise any crosslinked polymer known in the art that is capable of undergoing an irreversible degradation downhole. By way of example and not limitation, certain crosslinked degradable polymers may be prepared via a two-step process that involves (1) polymerizing and/or functionalizing a degradable polymer to form a functionalized degradable polymer and (2) crosslinking the molecules of the functionalized degradable polymer. Examples of processes that may be used to prepare crosslinked degradable polymers that may be suitable for use in the present invention are described in an article entitled "Structure Modification and Crosslinking of Methacrylated Polylactide Oligomers" by Antti O. Helminen et al. in The Journal of Applied Polymer Science, Vol. 86, pages 3616-3624 (2002), and WIPO Patent Application Publication No. WO 2006/053936 by Jukka Seppälä, the relevant disclosures of which are herein incorporated by reference.

For example, a degradable polymer (e.g., a polyester or poly(lactide)) may be polymerized to include different numbers of hydroxyl functional groups, or an existing degradable polymer may be functionalized with different numbers of hydroxyl functional groups, to form a functionalized degradable polymer having one or more carbon-carbon double bonds. These functional groups may be provided via reaction of the degradable polymer with a functionalizing agent that may comprise one or more diols, polyfunctional alcohols, dicarboxylic acids, polyfunctional carboxylic acids, anhydrides, and derivatives thereof. The choice of a particular functionalizing agent used may depend on several factors that will be recognized by a person of ordinary skill in the art with the benefit of this disclosure, including, but not limited to, the molecular structure and/or size of the functionalized degradable polymer desired. After at least one functionalized degradable polymer is generated, a crosslinking initiator and/or energy source may be used to form a radical at the double-bond site, and these radicals formed on different molecules of the functionalized degradable polymer may interact with each other so as to form one or more crosslinks between them. The crosslinking initiator may comprise any substance that is capable of forming a radical on the functionalized degradable polymer. Examples of suitable crosslinking initiators may include organic peroxy compounds (e.g., diazyl peroxides, peroxy esters, peroxy dicarbonates, monoperoxy carbonates, diperoxy ketals, dialkyl peroxides, sulfonyl peroxides, ketone peroxides, and peroxy carboxylic acids), inorganic peroxides (e.g., hydrogen peroxide, oxygen, ozone, and azo compounds), redox initiators, and derivatives thereof. Suitable energy sources may comprise a heat source, a light source, or a radiation source. The energy sources suitable for use in the present invention may vary by numerous different properties and settings, including but not limited to, wavelength of light produced, intensity of light produced, amount of heat produced, and the like. In certain embodiments, the light source may comprise an instrument that is capable of emitting blue light (e.g., light having a wavelength of about 400 nm to about 500 nm).

In certain embodiments of the present invention where this method of preparing the crosslinked degradable polymer is used, the crosslinking initiator may be formulated to remain inactive until it is "activated" by, among other things, certain conditions in the fluid (e.g., pH, temperature, etc.) and/or contact with some other substance. In some embodiments, the crosslinking initiator may be delayed by encapsulation with a coating that delays its release until a desired time or place. The choice of a particular crosslinking initiator and/or energy source will be governed by several considerations that will be recognized by one skilled in the art, including but not limited to the following: the type of functionalized degradable polymer included, the molecular weight of the functionalized degradable polymer, the pH of the treatment fluid, temperature, and/or the desired time at which to crosslink the degradable polymer. The exact type and amount of crosslinking initiator and/or the particular parameters of the energy source used depends upon the specific degradable polymer to be crosslinked, formation temperature conditions, and other factors recognized by those individuals skilled in the art, with the benefit of this disclosure.

Optionally, a crosslinking accelerator may be used, inter alia, to increase the rate at which the functionalized degradable polymers form crosslinks. Examples of suitable crosslinking accelerators that may be used include, but are not limited to, metal compounds (e.g., cobalt compounds), organic amines, and the like. The choice of whether to use a crosslinking accelerator, and, if used, the exact type and amount of the crosslinking accelerator is within the ability of those individuals skilled in the art, with the benefit of this disclosure.

Plasticizers optionally may be included in the degradable materials of the present invention. The plasticizers may be present in an amount sufficient to provide the desired characteristics, for example, a desired tackiness to the generated degradable particulates. In addition to the other qualities above, the plasticizers may enhance the degradation rate of the degradable materials. The plasticizers, if used, may be at least intimately incorporated within the degradable materials. An example of a suitable plasticizer for poly(lactide) would include oligomeric lactic acid. Examples of plasticizers useful for this invention include, but are not limited to, polyethylene glycol, polyethylene oxide, oligomeric lactic acid, citrate esters (such as tributyl citrate oligomers, triethyl citrate, acetyltributyl citrate, and acetyltriethyl citrate), glucose monoesters, partially fatty acid esters, PEG monolaurate, triacetin, poly(e-caprolactone), poly(hydroxybutyrate), glycerin-1-benzoate-2,3-dilaurate, glycerin-2-benzoate-1,3-dilaurate, bis(butyl diethylene glycol)adipate, ethylphthalylethyl glycolate, glycerin diacetate monocaprylate, diacetyl monoacyl glycerol, polypropylene glycol (and epoxy derivatives thereof), poly(propylene glycol)dibenzoate, dipropylene glycol dibenzoate, glycerol, ethyl phthalyl ethyl glycolate, poly(ethylene adipate)distearate, di-iso-butyl adipate, and derivatives thereof. The choice of an appropriate plasticizer may depend on, among other things, the particular degradable polymer utilized. It should be noted that, in certain embodiments, when initially formed, the degradable particulates may be somewhat pliable. However, once substantially all of the organic solvent has been removed, the particulates may harden. The addition or presence of a plasticizer can affect the relative degree of pliability after substantially all of the organic solvent has been removed. Also, the relative degree of crystallinity and amorphousness of the degradable material can affect the relative hardness of the degradable particulates.

The degradable materials used in the present invention may be included in the degradable material mixture in any amount sufficient to provide the desired availability of degradable particulates and/or the desired average size of degradable particulates. In certain embodiments, the degradable materials may be present in the degradable material mixture in the maximum amount that still allows for practicable mixing. In certain embodiments, the degradable material may be present in the mixture in an amount in the range of from about 0.1% to about 25% by weight of the mixture. In certain embodiments, the degradable material may be present in the mixture in an amount of about 20% by weight of the mixture.

The first solvent used in the degradable material mixture in the methods of this invention may comprise any solvent known in the art that is immiscible in the second solvent to be used in the step of combining the degradable material mixture and a fluid with sufficient shear to form an emulsion. The particular solvent that may be used in a method of the present invention may depend on, among other things, its interaction with the second solvent and/or components thereof. For example, in certain embodiments, the first solvent may comprise one or more organic solvents while the second solvent comprises an aqueous solvent. The particular first solvent used in a method of the present invention also may depend on, among other things, the degradable material chosen, the surfactant used, the concentration of the degradable material in the degradable material mixture, as well as other factors. Other considerations that may be taken into account when choosing a first solvent include safety and industrial hygiene, any potential environmental issues, potential safety issues in terms of flash point and potential exposure, and relative cost. Examples of organic solvents that may be suitable for use as the first solvent in the present invention include, but are not limited to, acetone, chloroform, methylene chloride, dichloromethane, 1,2-dichlorobenzene, tetrahydrofuran, benzene, acetonitrile, dioxane, dimethylformamide, toluene, ethyl acetate, N-methylpyrrolidone, xylene, ether, diphenyl ether, ethylbenzene, naphthalene, propylene carbonate, di(propylene glycol) methyl ether, di(propylene glycol) propyl ether, di(propylene glycol) butyl ether, di(propylene glycol) methyl ether acetate, and any derivatives thereof.

The first solvent should be included in an amount sufficient so that the degradable polymer solvent mixture has a low enough viscosity such that when it is added to the fluid with shear, the degradable material mixture forms a discontinuous phase in the fluid. This amount will vary based on several characteristics including, the particular degradable material utilized, the molecular weight of the degradable material, the concentration of the degradable material in the degradable material mixture, and the like. One of ordinary skill in the art with the benefit of this disclosure will be able to recognize the appropriate amount to include. In certain embodiments, a minimal amount of the first solvent may be used, among other reasons, to facilitate the subsequent removal of that first solvent to form degradable particulates. In certain embodiments, the first solvent will be substantially removed from the discontinuous phase of the emulsion to allow degradable particulates to form in a more efficient manner. In certain embodiments, the amount of the first solvent included will range from about 5% to about 80% by weight of the degradable material that is included in the degradable material mixture. In one example of one embodiment wherein poly(lactic acid) is used, dichloromethane may be used as the first solvent in an amount of 50% to 80% weight of poly(lactic acid) used.

If desired, optional additives such as oxidizers, salts, or other additives may be included in the degradable material mixture such that, in some cases, when the degradable particulates form, the additives become incorporated within the particulates. Any additive may be used so long as that additive does not adversely affect other components or portions of the degradable particulates and/or methods of the present invention. Including an optional additive may be desirable, for example, when it would be beneficial to introduce the additive into the subterranean formation upon or during degradation of the degradable particulates. These optional additives may have a specific desirable functionality. For example, some additives may modulate the rate of hydrolysis of the degradable particulates depending on the conditions encountered in the particular application. Examples of suitable additives that may be included in the degradable material mixture include, but are not limited to, filler materials (e.g., calcium carbonate), breakers, catalysts, salts, co-surfactants, acids, fluid loss control additives, gas, nitrogen, carbon dioxide, surface modifying agents, tackifying agents, corrosion inhibitors, scale inhibitors, clay control agents, biocides, friction reducers, antifoam agents (e.g., silicon), bridging agents, dispersants, flocculants, $H_2S$ scavengers, $CO_2$ scavengers, oxygen scavengers, lubricants, viscosifiers, gelling agents, weighting agents, relative permeability modifiers, resins, particulate materials (e.g., proppant particulates), wetting agents, coating enhancement agents, and the like. In one embodiment, an acid-soluble solid material may be added to the degradable material mixture so that the acid-soluble material becomes incorporated into the resultant degradable particulates. Examples of suitable acid-soluble solid materials include, but are not limited to, calcium carbonate and magnesium oxide. This may be desirable, among other purposes, to neutralize an acid generated upon degradation of the degradable particulates, to modulate the hydrolysis of the degradable particulates, and/or to add crush strength to the degradable particulates.

The fluids used in the methods of the present invention generally comprise a second solvent, which may comprise any solvent known in the art that is immiscible in the first solvent to be used in the step of combining the fluid with a degradable material mixture with sufficient shear to form an emulsion. In certain embodiments, the second solvent may comprise water to form an aqueous fluid that is then combined with the degradable material mixture. In those embodiments where the second solvent comprises water, the water may come from any water source that does not contain components that adversely affect the degradable material and/or other portions of the methods of the present invention. Suitable water sources may comprise fresh water, saltwater (e.g., water containing one or more salts dissolved therein), brine, and/or seawater. Generally, the water may be from any source, provided that it does not contain components that might adversely affect the stability and/or performance of the degradable particulates or methods of the present invention. In certain embodiments, the fluid may comprise an aqueous treatment fluid that will be introduced into the subterranean formation (e.g., a fracturing fluid, a gravel pack fluid, a drilling fluid, etc.). Thus, in such embodiments, the degradable particulates may be introduced into the subterranean formation along with the fluid, which would at last partially form the treatment fluid used in that particular subterranean treatment. In certain embodiments, the density and/or pH of the fluid can be adjusted, among other purposes, to provide additional particle transport and suspension in the fluid of the present invention. In these embodiments, the pH may be adjusted to a specific level, which may depend on, among other factors, the type(s) of surfactant(s), degradable materials, solvents, and other additives used. One of ordinary skill in the art, with the benefit of this disclosure, will recognize when such density and/or pH adjustments are appropriate.

The surfactants included in the fluid used in the methods of the present invention may comprise any suitable surfactant known in the art. In certain embodiments, the surfactant may comprise an emulsifying surfactant capable of forming and/or stabilizing an emulsion of a degradable material mixture and the fluid. In certain embodiments, the surfactant may be selected, in part, for its tendency to not generate large amounts of foam in the process of forming the emulsion. Such a surfactant is referred to herein as a "low-foam surfactant." Examples of surfactants that may be suitable for use in the present invention include any cationic, anionic, or nonionic surfactant capable of forming and/or stabilizing an emulsion as described herein. Specific examples include, but are not limited to, sodium dodecyl sulfate, poly(vinyl alcohol), sodium dodecylbenzenesulfonic acid, cetyltrimethylammonium bromide, cetylpyridinium bromide, hexadecylmaltoside, acrylic surfactants, and derivatives thereof. Examples of commercially-available surfactants that may be suitable for use in the present invention include, but are not limited to those surfactants available under the following tradenames: ATLOX® polymeric surfactants (available from Uniqema in New Castle, Del.); TRITON™ X-100 (available from Dow Chemical Co. in Midland, Mich.); TWEEN™ 20 (available from Uniqema in New Castle, Del.); and TERGITOL™ NP-40 (available from Dow Chemical Co. in Midland, Mich.). Other surfactants include free fatty acids, esters of fatty acids, with polyoxyalkylene compounds (like polyoxyethylene glycol, fatty acid esters with sorbitan, soaps, etc.). The choice of which particular surfactant to use may depend on, among other factors, the particular degradable material(s), solvent(s), and fluids used in any given embodiment. In certain embodiments, the particular surfactant used may be selected for its ability to prevent foaming in the emulsion and/or to control the size of the degradable particulates generated. In certain embodiments, the surfactant should be included in an amount sufficient to stabilize the emulsion and/or to control the amount of foam generated. In some embodiments, this may be from about 0.1% to about 5% by weight of the continuous phase. The amount of surfactant to include may depend on, among other things, the type of degradable material used and/or the type of the first and second solvents used, the particular surfactant used and how well that surfactant stabilizes the emulsion, and the ability of the particular surfactant chosen to potentially help prevent the agglomeration of degradable particulates once formed.

The fluid used in the methods of the present invention optionally may comprise any number of additional additives, including, but not limited to, salts, surfactants, acids, fluid loss control additives, gas, nitrogen, carbon dioxide, surface modifying agents, tackifying agents, corrosion inhibitors, scale inhibitors, catalysts, clay control agents, biocides, friction reducers, antifoam agents (e.g., silicone), bridging agents, suspending agents, dispersants, gelling agents, flocculants, $H_2S$ scavengers, $CO_2$ scavengers, oxygen scavengers, lubricants, viscosifiers, breakers, weighting agents, relative permeability modifiers, resins, particulate materials (e.g., proppant particulates), wetting agents, coating enhancement agents, and the like. A person skilled in the art, with the benefit of this disclosure, will recognize the types of additives that may be included in the fluid in a particular application. These additives may be added to the fluid at any time before, during, or after performing any portion of a method of the present invention. For example, a gelling agent (e.g., xanthan) or suspending agent may be added after at least some portion of degradable particulates have been formed, among other purposes, to maintain a slurry or suspension of the particulates in the fluid. In these embodiments, the gelling agent may be added in an amount of about 0.1% by weight of the second solvent.

The fluid should be included in the methods of this invention in an amount sufficient to, inter alia, (1) aid in the removal of the first solvent from the degradable material mixture so that degradable particulates form, and/or (2) form an adequate emulsion. The amount of fluid to use may vary depending on certain factors, for example, the desired characteristics of the resultant degradable particulates, the concentration of the degradable material mixture in the fluid, the concentration of the degradable material in the degradable material mixture, and the amount of degradable particulates to be produced. In some embodiments, the amount of the fluid to include may be about 1% or less relative to the emulsion; in other embodiments, the fluid may be included in an amount of about 95% or more relative to the emulsion. To ensure that desirable degradable particulates form, the degradable material should not be substantially soluble in the fluid.

The degradable material mixture and the fluid may be combined with sufficient shear to form an emulsion using any means, equipment, or methods known in the art that provides sufficient shear. In certain embodiments, a high shear mixer may be used to provide sufficient shear to form the emulsion. In certain embodiments, the high shear mixer may be set to operate at a tip speed of from about 30 to about 90 feet per second. Examples of other equipment that may be suitable in certain embodiments of the present invention include, but are not limited to, high speed dispersers, jet nozzles, in-line mixers, and the like. The degradable material mixture and the fluid should be combined and mixed until an emulsion forms, which can be ascertained by a person skilled in the art upon visual inspection.

After an emulsion is formed, at least a portion of the first solvent may be removed from the discontinuous phase of the emulsion by any means or method known in the art. Examples of suitable methods of removing at least a portion of the first solvent include, but are not limited to, vacuum stripping, steam stripping, evaporation, and the like. The first solvent should be removed from the emulsion at least until particulates comprising the degradable material form. In certain embodiments, substantially all of the first solvent in the discontinuous phase of the emulsion may be removed. In certain embodiments, the removal of the first solvent may produce a slurry of degradable particulates suspended in the second solvent.

The amount of degradable particulates produced in a method of the present invention may be any amount that is practicable and/or desired for a particular application. Where the methods of the present invention produce a slurry of degradable particulates suspended in fluid, the degradable particulates may be present in that slurry in any amount up to the maximum amount that will still allow the slurry to be pumped. In certain embodiments, the degradable particulates may be present in a slurry in an amount up to about 20% by weight of the second solvent. The methods of the present invention may be performed on any scale to provide the desired amount of degradable particulates. In certain embodiments, the methods of the present invention may be used on a relatively small scale to produce about 100 kg or less of degradable particulates. In other embodiments, the methods of the present invention may be used on a larger scale to produce about 3000 kg or more of degradable particulates.

The average particle size of the degradable particulates produced in the methods of the present invention may be any size that is appropriate for an intended use of those particulates. The desired average particle size for a particular embodiment of the present invention may depend on, among other things, the desired level of reactivity of the degradable material and/or the intended function of the degradable particulates in a particular use. For example, if the degradable material is intended to be used as a bridging agent or fluid loss agent in a subterranean formation, the degradable particulates should be relatively small. In certain embodiments, the average particle size of the degradable particulates may be about 1 mm or less in diameter. In certain embodiments, the average particle size of the degradable particulates may be about 10 microns or less in diameter. In these embodiments, the average size distribution of the degradable particulates may vary, depending on several factors. These factors include, but are not limited to, the type of surfactant used, the amount of surfactant used, the type of solvent(s) used, the chemical interaction between the first and second solvents, the particular degradable material used, the molecular weight of the degradable material, the concentration of the degradable material in the degradable material mixture, the amount of shear applied, the presence of certain additional additives, the temperature conditions, and the like. The desired average particle size distribution can be modified as desired by modifying any of these factors. One of ordinary skill in the art with the benefit of this disclosure will be able to identify the particular factor(s) to modify to achieve a desired particulate size distribution.

Once the degradable particulates have been formed, the methods of the present invention optionally may comprise numerous additional processes or steps involving those particulates. In certain embodiments, additional fluids (e.g., aqueous, non-aqueous, etc.) and/or additives (e.g., gelling agents, suspending agents, salts, and the like) may be combined with the degradable particulates formed, among other purposes, to form a treatment fluid or slurry that may be stored for some period time and/or used in a subsequent operation. However, in certain embodiments, the methods discussed above will produce a slurry of the degradable particulates suspended in the second solvent (which may comprise additional additives), and thus combination with additional fluids and/or additives may not be necessary to form a treatment fluid or slurry that is suitable for use in the desired operation.

In certain embodiments, the methods of the present invention optionally may comprise separating the degradable particulates produced in a method of the present invention, for example, from the second solvent and/or other additives therein. This separation may be accomplished by any means or method known in the art for separating particulates from fluids. Examples of suitable methods of separating the degradable particulates include, but are not limited to, filtering, centrifuging, spray drying, and the like.

The present invention also provides precipitation methods that may be used to generate degradable particulates of a suitable or desirable size and shape for use in subterranean applications. The degradable particulates can be used in a subterranean application with or without a treatment fluid, depending on the use.

A precipitation method for forming degradable particulates comprises: providing a degradable material solvent mixture that comprises a degradable material and a first solvent; and mixing the degradable material solvent mixture in a second solvent with shear to form a solid liquid dispersion comprising a solid phase and a liquid phase, the solid phase comprising degradable particulates and the liquid phase comprising the first solvent and the second solvent. In these precipitation methods, the first solvent and the second solvent should be soluble in each other, and the degradable material used should not be soluble in the second solvent. In certain embodiments, the first solvent may be more soluble in the second solvent than the degradable material. As a result of, inter alia, this solubility, the first solvent should go from the degradable material solvent mixture to the second solvent without an additional removal step.

Any suitable shearing device may be used in these methods including, but not limited to, high speed dispersers, jet nozzles, in-line mixers, and the like. The shearing device chosen should generate sufficient shear so that the solid-liquid dispersion forms. One should note that the particle size distribution of the resultant degradable particulates may be a function of the shearing device and the amount of shear used. For instance, more or stronger shear may result in smaller particulates, depending on the degradable polymer utilized.

The resultant degradable particulates can be used in a subterranean application with or without a treatment fluid, depending on the use. In some embodiments, the second solvent may be the treatment fluid. This may be beneficial when a high concentration of degradable particulates in the fluid is desired. In alternative embodiments, the degradable particulates can be made in a batch process and then at a desired time, they may be added to a process stream to be placed in a subterranean formation. A batch method may be useful when a lower concentration of degradable particulates is desired for the application.

The degradable material solvent mixture may be any suitable type of mixture of a degradable material and a solvent including, but not limited to, a solution, a suspension, or an emulsion. In one embodiment, the degradable material solvent mixture may be formed by forming a degradable monomer solvent mixture (which may be an emulsion, a solution, or a suspension), and then reacting the degradable monomer solvent mixture to polymerize the monomer to form a degradable polymer solvent mixture that may be used to form degradable particulates. One of ordinary skill in the art with the benefit of this disclosure will recognize the amount of heat, catalyst, or time will be needed to affect polymerization.

One consideration will be the type of monomer and solvent used. Any suitable heating device may be used.

In some embodiments, it may be desirable to add a surfactant at some point in the precipitation process, e.g., in the solid-liquid dispersion. Adding a surfactant may help prevent agglomeration of the resultant degradable particulates. In some embodiments, the precipitation methods may be relatively slower than the emulsion methods, which may result in the degradable particulates being more tacky and liable to agglomerate. If more pliable or tacky particulates are desired for a given application, then a precipitation method of this invention may be most suitable. Examples of suitable emulsifying surfactants include any cationic, anionic, or nonionic surfactant capable of preventing agglomeration of the particulates. Specific examples include, but are not limited to, sodium dodecyl sulfate, poly(vinyl alcohol), sodium dodecylbenzenesulfonic acid, cetyltrimethylammonium bromide, cetylpyridinium bromide, hexadecylmaltoside, TRITON™ X-100, TWEEN™ 20, BRIJ W1, and TERGITOL™ NP-40. The choice of which particular surfactant to use may be determined by the particular degradable polymer, first solvent, and second solvent used in any given embodiment. In certain embodiments, the surfactant should be included in an amount sufficient to prevent degradable particulate agglomeration. In some embodiments, this may be from about 0.1% to about 5% based on the amount of the second solvent.

The same degradable materials are suitable for these methods as those listed and discussed above with respect to the emulsion methods of the present invention. Examples of suitable degradable materials that may be used in conjunction with these methods include, but are not limited to, aliphatic polyesters; poly(lactides); poly(hydroxy ester ethers); poly(glycolides); poly(ε-caprolactones); poly(hydroxybutyrates); poly(anhydrides); polycarbonates; poly(orthoesters); poly(amino acids); poly(ethylene oxides); poly(phosphazenes); poly ether esters; polyester amides; polyamides; and copolymers or blends of any of these degradable materials. Other degradable materials that are subject to hydrolytic degradation also may be suitable.

Plasticizers as discussed above with respect to the emulsion methods of this invention may be included in the degradable materials, if desired. One should note though to achieve the most beneficial effects of this invention, it is preferred that the plasticizers should not be soluble in the second solvent.

Additionally, the same suitable first solvents as those described above with respect to the emulsion methods of the present invention are suitable for use in the precipitation methods of this invention. In these precipitation methods, the first solvent should be chosen relative to the second solvent such that the first solvent is soluble in the second solvent. In certain embodiments, the first solvent may be capable of at least partially dissolving the degradable material chosen. The choice of the first solvent may depend on the degradable material used in a particular embodiment and the second solvent chosen. The first solvent should be included in an amount sufficient to form a degradable material solvent mixture that can be mixed with a second solvent to form a solid-liquid dispersion. In certain embodiments, the amount of first solvent included will range from about 5% to about 80% based on the amount of the degradable material that is included in the degradable material solvent mixture. In one example of one embodiment wherein poly(lactic acid) is used, a propylene carbonate first solvent may be used in an amount of 50% to 80% based on the weight of poly(lactic acid) used.

The second solvent should be chosen in the precipitation methods relative to the first solvent such that the first solvent is soluble in the second solvent. Suitable aqueous-based second solvents may comprise a water source such as fresh water, saltwater (e.g., water containing one or more salts dissolved therein), brine (e.g., saturated saltwater), or seawater. Generally, the water source can be from any source, provided that it does not contain an excess of compounds that may adversely affect the process or the formation of degradable particulates. Potentially problematic compounds to be mindful of will be evident to one skilled in the art with the benefit of this disclosure. Examples of nonaqueous second solvents that may be used include ethanol, isopropanol, or a polyhydric alcohol (such as glycerol or water soluble solvents). As stated above, the second solvent may be a treatment fluid that will be introduced into the subterranean formation (e.g., a fracturing fluid, a gravel pack fluid, a drilling fluid, etc.). Thus, in such embodiments, the resultant degradable particulates may be introduced into the subterranean formation with the second solvent, which would be the treatment fluid used in that particular subterranean application. The second solvent should be included in an embodiment of the precipitation methods of this invention in an amount sufficient to form the solid-liquid dispersion and allow the degradable particulates to form. The amount of second solvent to use may vary depending on certain factors, for example, the identity of the first solvent; the quantity of the degradable material solvent mixture; the desired characteristics of the resultant degradable particulates; the concentration of the degradable material solvent mixture in the second solvent; the concentration of the degradable material in the degradable material solvent mixture, and the amount of degradable particulates to be produced. In some embodiments, the amount of second solvent to include may be about 1% or less relative to the mixture; in other embodiments, the second solvent may be included in an amount of about 95% or more relative to the mixture. To ensure that desirable degradable particulates form, the degradable material should not be substantially soluble in the second solvent.

If desired, optionally additives such as oxidizers, salts, or other chemical agents may be included in the degradable material solvent mixture such that when the degradable particulates form, the additives are incorporated within the particulates. Any additive that is capable of becoming incorporated into the degradable particulates during the precipitation process may be used. Preferably the additive should not be soluble in the first solvent, the second solvent, or the liquid phase of the solid-liquid dispersion. Any such additives may have a specific desirable functionality. For example, some additives may modulate the rate of hydrolysis of the degradable particulates depending on the conditions encountered in the particular application. Including an additive may be desirable when it would be beneficial to introduce the additive into the subterranean formation upon or during degradation of the degradable particulates. When contemplating the addition of an additive, one should be mindful that the additive should not adversely affect other operations or components. In an example of an alternative embodiment, an acid-soluble solid material may be added to the degradable material solvent mixture so that the acid-soluble material becomes incorporated into the resultant degradable particulates. Examples of suitable acid-soluble solid materials include, but are not limited to, calcium carbonate and magnesium oxide. This may be desirable, for example, to neutralize the acid generated upon degradation of the degradable particulates, to modulate the hydrolysis of the degradable particulates, or to add crush strength to the degradable particulates.

In these embodiments, the average size distribution of the resultant degradable particulates may vary, depending on several factors. These factors may include, the type of first solvent used, the type of second solvent used, the chemical interaction between the first solvent and the second solvent, the particular degradable material used, the molecular weight of the degradable material, the concentration of the degradable material in the degradable material solvent mixture; the amount of shear applied; the type of shearing device, the presence of various additives, the temperature conditions, etc.

Certain embodiments of the methods of the present invention may use melt coagulation techniques to produce degradable particulates of a suitable or desirable size and shape for use in subterranean applications. The degradable particulates can be used in a subterranean application with or without a treatment fluid, depending on the use.

A melt coagulation method of this invention comprises the steps of providing a degradable material melt; atomizing the degradable material melt into an atomization fluid stream; and allowing degradable particulates to form.

The degradable material melt may be formed by heating a degradable material to at or above its melting point. Any suitable device to produce or provide a degradable material melt may be used in the melt coagulation methods of this invention. Shear may be incorporated into such a device, if desired.

During the atomization step, the degradable material melt is atomized into a atomization fluid stream in which the degradable material is not soluble. The atomization fluid stream may comprise a gas or a liquid, depending on the particular application. Pressure may be desirable to encourage the melt to proceed through the atomization device. Any suitable atomization device may be used in the melt coagulation methods of the present invention. One example of a suitable atomization device is a nozzle that has an appropriate diameter to produce degradable particulates having a desired shape or size. In some embodiments, the same sort of equipment used in applications to spray hot melt adhesives may be used. The degradable material melt may be atomized into an atomization fluid stream, which may comprise a liquid and/or a gas. The atomization fluid stream may comprise a treatment fluid in which the degradable particulates will be introduced into a subterranean formation for a desired application. In choosing the appropriate atomization fluid stream, one should be mindful that the degradable particulates should not be soluble in the atomization fluid stream. The desired concentration of degradable particulates in a treatment fluid may govern what type of fluid is used in the atomization fluid stream, including whether atomizing into a treatment fluid is appropriate. During this step, one should be mindful that the atomization should be done in such a manner that whole droplets of a desired size and shape are formed so that the resultant degradable particulates will have the desired shape and size. Atomization may occur in any suitable apparatus. A fluidized bed reactor is an example of a suitable apparatus. A high pressure nozzle is another example of a suitable apparatus. Certain suitable apparatus may have a sufficient amount of fluid and the temperature is low enough to allow the degradable particulates to cool and form degradable particulates. The temperature and pressure at which the atomization is accomplished may impact greatly the size and shape of the resultant degradable particulates. Other factors that can affect the qualities of the resultant degradable particulates include the particular atomization device, the orifice of the atomization device, the temperature of the melt, the temperature and pressure conditions of the atomization process, etc.

If desired, optionally, the degradable material melt may comprise additional additives as long as they are not sensitive to or negatively impacted by the heating of the melt. Any such additives also should not negatively impact the degradable material melt itself, the atomization process or the formation of degradable particulates. Examples of suitable additives include oxidizers, salts, or other chemical agents that are desirable to have incorporated in the resultant degradable particulates. Any additive that is capable of becoming incorporated into the degradable particulates during a melt coagulation process may be used. Any such additives may have a specific desirable functionality. For example, some additives may modulate the rate of hydrolysis of the degradable particulates depending on the conditions encountered in the particular application. Including an additive may be desirable when it would be beneficial to introduce the additive into the subterranean formation upon or during degradation of the degradable particulates. When contemplating the addition of an additive, one should be mindful that the additive should not adversely affect other operations or components. In an example of an alternative embodiment, an acid-soluble solid material may be added to the degradable material melt so that the acid-soluble material becomes incorporated into the resultant degradable particulates. Examples of suitable acid-soluble solid materials include, but are not limited to, calcium carbonate and magnesium oxide. This may be desirable, for example, to neutralize the acid generated upon degradation of the degradable particulates, to modulate the hydrolysis of the degradable particulates, or to add crush strength to the degradable particulates.

All of the degradable material discussed above with respect to the emulsion and precipitation methods may be used in the melt coagulation methods of this invention. In certain embodiments, the particular degradable material chosen may have a relatively lower molecular weight and melt viscosity. In certain embodiments, degradable materials that will form droplets upon atomization may be used. Examples of suitable degradable material that may be used in conjunction with the melt coagulation methods of this invention include, but are not limited to, aliphatic polyesters; poly(lactides); poly(hydroxy ester ethers); poly(glycolides); poly($\epsilon$-caprolactones); poly(hydroxybutyrates); poly(anhydrides); polycarbonates; poly(orthoesters); poly(amino acids); poly(ethylene oxides); poly(phosphazenes); poly ether esters; polyester amides; polyamides; and copolymers or blends of any of these degradable materials. Preferred examples of degradable materials for use in the melt coagulation methods of this invention include poly(lactides), poly(glycolides), poly($\epsilon$-caprolactones), and poly(hydroxybutyrates). Other degradable materials that are subject to hydrolytic degradation also may be suitable.

Plasticizers may be included in the degradable materials to achieve desired properties in the resultant degradable particulates or the degradable materials melt. Any of the above listed plasticizers are suitable for use in the melt coagulation methods of this invention as long as they are tolerant to the melt and atomization processes such that the plasticizer remains in the resultant degradable particulates to provide desired properties. The choice of plasticizer(s) will depend on the particular degradable material chosen for a particular embodiment of these melt coagulation methods and the application in which the degradable particulates will be used. In some embodiments, plasticizers may be particularly helpful to increase the melt viscosity and improve atomization of the melt.

One should note that if the resultant degradable particulates will be used in conjunction with a nonaqueous treatment fluid, the melt coagulation methods of this invention may be suitable as long as the treatment fluid does not dissolve the degradable particulates.

In certain embodiments, it may be desirable to include a surfactant in the atomization fluid. The surfactant may, inter alia, help disperse the degradable particulates in the atomization fluid. Examples of suitable surfactants include any cationic, anionic, or nonionic surfactant capable of helping disperse the degradable particulates in the atomization fluid. Specific examples include, but are not limited to, sodium dodecyl sulfate, poly(vinyl alcohol), sodium dodecylbenzenesulfonic acid, cetyltrimethylammonium bromide, cetylpyridinium bromide, hexadecylmaltoside, TRITON™ X-100, TWEEN™ 20, BRIJ W1, and TERGITOL™ NP-40. The choice of which particular surfactant to use may be determined by the particular degradable material chosen, the melt conditions, and the atomization process chosen. In certain embodiments, the surfactant should be included in an amount sufficient to prevent degradable particulate agglomeration. In some embodiments, this may be from about 0.1% to about 5% based on the amount of degradable particulates in the atomization fluid.

The particle size of the degradable particulates can be altered by changing various factors in the process. For instance, the melt temperature, the particular atomization device, the conditions encountered in the atomization device (e.g., temperature and pressure), the rate at which the atomization occurs, additives, and the like may all be altered to produce degradable particulates having differing sizes and/or characteristics. One of ordinary skill in the art with the benefit of this disclosure will recognize the variables and the degree of variation required to produce the degradable particulates for use in a particular application.

Certain embodiments of the methods of the present invention may use supercritical fluid assisted methods to produce degradable particulates of a suitable or desirable size and shape for use in subterranean applications. The degradable particulates can be used in a subterranean application with or without a treatment fluid, depending on the use. These supercritical fluid assisted methods may be especially useful for forming smaller degradable particulates. For instance, in certain embodiments, these methods may be used to produce 1- to 3-μm degradable particulates that may have a lower tendency to agglomerate.

Various supercritical fluids, such as supercritical carbon dioxide, may be suitable in these methods. Generally speaking, the use of a supercritical carbon dioxide may be desirable because it is considered an environmentally-friendly solvent substitute. Carbon dioxide is considered to be nontoxic, nonflammable, and has easily accessible critical conditions, i.e., $T_c=31°$ C. and $P_c=7.37$ MPa.

An example of a supercritical fluid assisted method of this invention is a method of forming degradable particulates that comprises: providing a degradable material supercritical fluid mixture; allowing the degradable material supercritical fluid mixture to expand through an orifice into a lower pressure zone; and allowing degradable particulates to form. The lower pressure zone may be any suitable lower pressure area including, but not limited to, a chamber in a piece of equipment, a fluid, a treatment fluid in which the resultant degradable particulates will be introduced into a subterranean formation, or the like. The degradable material supercritical fluid mixture may be mixed at the drill site or premixed at a second location and then brought to the drill site.

In alternative embodiments, a suitable solvent and/or a surfactant may be incorporated into the degradable material supercritical fluid mixture, for example, when the degradable material is not sufficiently soluble in the supercritical fluid without the solvent or surfactant. Any solvent or surfactant that will aid in the dissolution of the degradable material in the supercritical fluid may be suitable. Preferred solvents and surfactants also may be compatible with the circumstances surrounding the particular subterranean application of the degradable particulates. The particular solvent or surfactant used depends in large part on the identity of the degradable material chosen for a specific embodiment.

The choice of an optional solvent for the degradable material supercritical fluid mixture in the emulsion methods of this invention will depend, inter alia, on the particular degradable material chosen, the concentration of the degradable material in the supercritical degradable material mixture, etc. Examples of suitable solvents include, but are not limited to, acetone, chloroform, dichloromethane, 1,2-dichlorobenzene, tetrahydrofuran, benzene, acetonitrile, dioxane, dimethylformamide, toluene, ethyl acetate, N-methylpyrrolidone, xylene, ether, diphenyl ether, ethylbenzene, naphthalene, propylene carbonate, di(propylene glycol) methyl ether, di(propylene glycol) propyl ether, di(propylene glycol) butyl ether, di(propylene glycol) methyl ether acetate, and derivatives thereof. Fluorinated alcohols and fluorinated hydrocarbons may be especially useful, depending on the particular degradable material chosen and the conditions of the particular application. In choosing a solvent to use in an embodiment of a supercritical fluid assisted method of this invention, one should be mindful of the properties of that solvent and any regulations that may apply, especially if the degradable particulates will be made on-the-fly, which could result in at least some of the solvent being introduced into a subterranean formation. Other considerations to be taken into account when choosing a solvent include safety and industrial hygiene, any potential environmental issues, potential safety issues in terms of flash point and potential exposure, and relative cost. If used, the solvent should be included in an amount sufficient to aid in the formation of the degradable material supercritical fluid mixture.

Examples of suitable optional surfactants that may be used in these methods include any cationic, anionic, or nonionic surfactant. Specific examples include, but are not limited to, sodium dodecyl sulfate, poly(vinyl alcohol), sodium dodecylbenzenesulfonic acid, cetyltrimethylammonium bromide, cetylpyridinium bromide, hexadecylmaltoside, TRITON™ X-100, TWEEN™ 20, BRIJ W1, and TERGITOL™ NP-40. The choice of which particular surfactant to use may be determined by the particular degradable material chosen. In certain embodiments, the surfactant should be included in an amount sufficient to stabilize the degradable material supercritical fluid mixture. In some embodiments, this may be from about 0.1% to about 5% based on the amount of degradable material in a degradable material supercritical fluid mixture.

All of the degradable material discussed above with respect to the emulsion, precipitation, and melt coagulation methods may be used in the supercritical fluid assisted methods of this invention. Examples include, but are not limited to, aliphatic polyesters; poly(lactides); poly(glycolides); poly(ε-caprolactones); poly(hydroxybutyrates); poly(anhydrides); polycarbonates; poly(orthoesters); poly(amino acids); poly(ethylene oxides); poly(phosphazenes); polyether esters; polyester amides; polyamides; and copolymers or blends of any of these degradable materials. Plasticizers may be included in the degradable materials to achieve the desired properties. Any plasticizer is suitable as long as it is not negatively impacted by or does not negatively impact the formation of the degradable particulates. In choosing the particular degradable material for a chosen application, one should note that some of the degradable materials may have lower solubility in supercritical fluids than others. It may be desirable to take this relative solubility into account when mixing or providing a degradable material supercritical fluid mixture. As stated above, solvents or surfactants may be included if needed.

Allowing the degradable material supercritical fluid mixture to expand through an orifice into a lower pressure zone may be accomplished by any suitable method. The degradable material supercritical fluid mixture may be allowed to expand through a suitable nozzle, for example, into a zone having a lower pressure. One should note that the pressure and temperature conditions used in the expansion step may affect the size and properties of the resultant degradable particulates. The geometry of the orifice also can greatly affect the characteristics of the resultant degradable particulates. The concentration of the degradable material in the degradable material supercritical fluid mixture also may affect the properties of the resultant degradable particulates. The lower pressure zone may be internal to or external to a well bore in subterranean formation. In some embodiments, the lower pressure zone may comprise a treatment fluid in which the degradable particulates will be introduced into a subterranean formation.

The degradable particulates can be used in a subterranean application alone, in combination with other additives, and/or in a slurry or treatment fluid (e.g., a slurry or treatment fluid formed according to the methods of the present invention), depending on the particular application and the surrounding circumstances. One of ordinary skill in the art with the benefit of this disclosure will be able to recognize when the degradable particulates should be or should not be used in conjunction with additional additives, a slurry, and/or a treatment fluid. Factors that one of ordinary skill in the art may consider in determining how the degradable particulates should be used include, but are not limited to, the presence of a slurry or dispersion formed in the process of forming the degradable particulates, the ability to incorporate the degradable particulates in the treatment fluid, the need to store the degradable particulates for some period of time, the timing desired for the degradation of the degradable particulates, the concentration of degradable particulates needed in a chosen treatment fluid, and the like.

When incorporated into a treatment fluid, the degradable particulates and treatment fluid (and/or components thereof) may be combined using any means or method known in the art. The degradable particulates, treatment fluid, and/or components thereof may be prepared at a job site, or they may be prepared at a plant or facility prior to use, and may be stored for some period of time prior to use. In certain embodiments, the degradable particulates and/or treatment fluids may be prepared at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing also can be described as "real-time" mixing.

The degradable particulates made by a method of this invention may be used in any suitable subterranean application. Suitable subterranean applications may include, but are not limited to, preflush treatments, afterflush treatments, drilling operations, hydraulic fracturing treatments, sand control treatments (e.g., gravel packing), acidizing treatments (e.g., matrix acidizing or fracture acidizing), "frac-pack" treatments, well bore clean-out treatments, and other operations where the degradable particulates and methods of the present invention may be useful. The degradable particulates could be used in various different ways in these operations, including but not limited to uses as fluid loss control particulates, diverting agents, filter cake components, bridging agents, drilling fluid additives, fluid loss control agents, cement composition additives, weighting agents, other acid-precursor components, and the like. Depending on the particular use, the degradable particulates may have several purposes. For example, the degradable particulates may be used to create voids upon degradation, release certain desirable degradation products that may then be useful for a particular function, temporarily restrict the flow of a fluid. Specific nonlimiting embodiments of some examples are discussed below.

In some methods, the degradable particulates may be used to increase the conductivity of a fracture. This may be accomplished by incorporating the degradable particulates into a fracturing fluid comprising proppant particulates, allowing the proppant particulates to form a proppant matrix within a fracture that comprises the degradable particulates, and allowing the degradable particulates to degrade to form voids within the proppant matrix. The term "proppant matrix" refers to some consolidation of proppant particulates.

In another example of a subterranean application, the degradable particulates may be used to divert a fluid within a subterranean formation.

In another example, the degradable particulates may be used in a composition designed to provide some degree of sand control to a portion of a subterranean formation. In an example of such a method, the degradable particulates may be incorporated into a cement composition which is placed downhole in a manner so as to provide some degree of sand control. An example of such a cement composition comprises a hydraulic cement, sufficient water to form a pumpable slurry, and the degradable particulates formed by a method of this invention. Optionally, other additives used in cementing compositions may be added.

In another example, the degradable particulates may be incorporated into a cement composition to be used in a primary cementing operation, such as cementing casing in a well bore penetrating a subterranean formation. An example of such a cement composition comprises a hydraulic cement, sufficient water to form a pumpable slurry, and the degradable particulates formed by a method of this invention. Optionally, other additives used in cementing compositions may be added.

In another example, the degradable particulates may be incorporated in a gravel pack composition. Upon degradation of the degradable particulates, any acid-based degradation products may be used to degrade an acid-soluble component in the subterranean formation, including but not limited to a portion of a filter cake situated therein.

In another example, the degradable particulates may be incorporated with a viscosified treatment fluid (e.g., a fracturing fluid or a gravel pack fluid) to act as a breaker for the viscosified treatment fluid (i.e., at least partially reduce the viscosity of the viscosified treatment fluid).

In another example, the degradable particulates may be used as self-degrading bridging agents in a filter cake.

In another example, the degradable particulates may be used as a fluid loss control additive for at least partially controlling or minimizing fluid loss during a subterranean treatment such as fracturing.

In another example, the degradable particulates may be used in conjunction with cleaning or cutting a surface in a subterranean formation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite article "a", as used in the claims, is defined herein to mean to one or more than one of the element that it introduces. Also, the terms in the claims have their plain, ordinary meaning unless otherwise explicitly and clearly defined by the patentee.

What is claimed is:

1. A method comprising:
providing a degradable material supercritical fluid mixture that comprises degradable material into a wellbore penetrating a zone within a subterranean formation;
providing an orifice between the wellbore and the zone within the subterranean formation wherein the pressure in the zone within the subterranean formation is less than the pressure in the wellbore;
feeding the degradable material supercritical fluid through the orifice into the zone within the subterranean formation such that the degradable material supercritical fluid mixture expands through an orifice into the zone within the subterranean formation; and,
allowing degradable particulates to form.

2. The method of claim 1 wherein at least about 3000 kg of degradable particulates are formed.

3. The method of claim 1 wherein the degradable material comprises at least one degradable material selected from the group consisting of an aliphatic polyester, a poly(lactide), a poly(glycolide), a poly(ε-caprolactone), a poly(hydroxy ester ether), a poly(hydroxybutyrate), a poly(anhydride), a polycarbonate, a poly(orthoester), a poly(orthoether), a poly (amino acid), a poly(ethylene oxide), a poly(phosphazene), a poly ether ester, a polyester amide, a polyamide, a copolymer thereof, and any derivative thereof.

4. The method of claim 1 wherein the degradable material supercritical fluid mixture further comprises a solvent.

5. The method of claim 4 wherein the solvent comprises at least one degradable material selected from the group consisting of acetone, chloroform, dichloromethane, 1,2-dichlorobenzene, tetrahydrofuran, benzene, acetonitrile, dioxane, dimethylformamide, toluene, ethyl acetate, N-methylpyrrolidone, xylene, ether, diphenyl ether, ethylbenzene, naphthalene, propylene carbonate, di(propylene glycol) methyl ether, di(propylene glycol) propyl ether, di(propylene glycol) butyl ether, di(propylene glycol) methyl ether acetate, and derivatives thereof.

6. The method of claim 4 wherein the solvent further comprises at least one acrylic surfactant.

7. The method of claim 1 wherein the average particle size of the solid degradable particulates is about 1 mm or less in diameter.

* * * * *